(No Model.)

H. G. & G. C. MILLER.
LAWN MOWER.

No. 439,806.  Patented Nov. 4, 1890.

Witnesses:
Fred Gerlach
Jno. C. MacGregor

Inventors:
H. G. Miller,
G. C. Miller,
By L. L. Morrison,
Attorney.

UNITED STATES PATENT OFFICE.

HORACE G. MILLER AND GRANT C. MILLER, OF MOUNT VERNON, IOWA, ASSIGNORS OF ONE-HALF TO WILLIAM C. BLINN, OF ROCKFORD, ILLINOIS.

LAWN-MOWER.

SPECIFICATION forming part of Letters Patent No. 439,806, dated November 4, 1890.

Application filed June 30, 1890. Serial No. 357,928. (No model.)

*To all whom it may concern:*

Be it known that we, HORACE G. MILLER and GRANT C. MILLER, citizens of the United States, residing at Mount Vernon, in the county of Linn and State of Iowa, have invented a certain new and useful Improvement in Lawn-Mowers, of which the following is a specification.

Our invention relates to grass-receptacles, means for securing them to lawn-mowers, and mechanism for dumping the same; and it consists of certain new and useful features of construction and combinations of parts, hereinafter described, and specifically pointed out in the claims.

Figure 1:
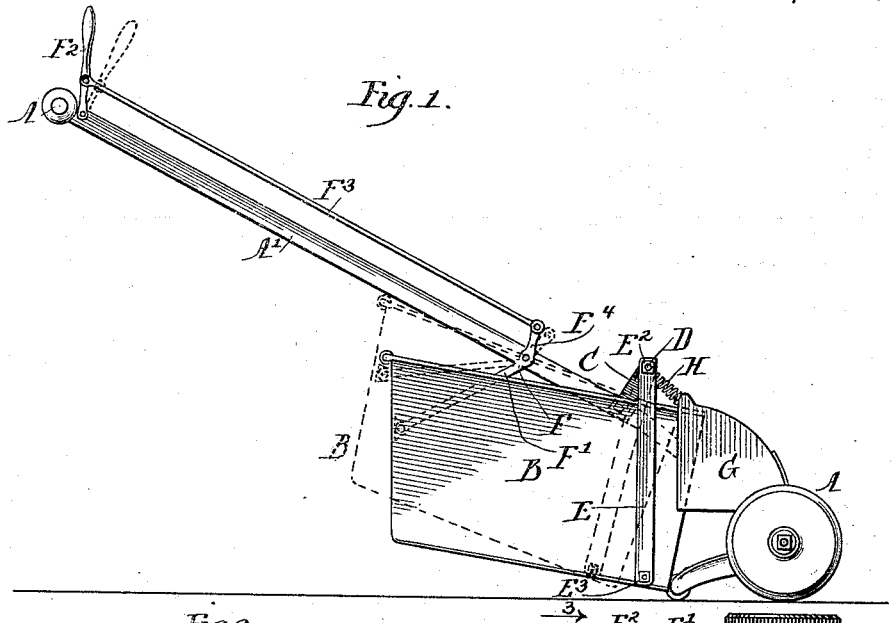
Figure 2:
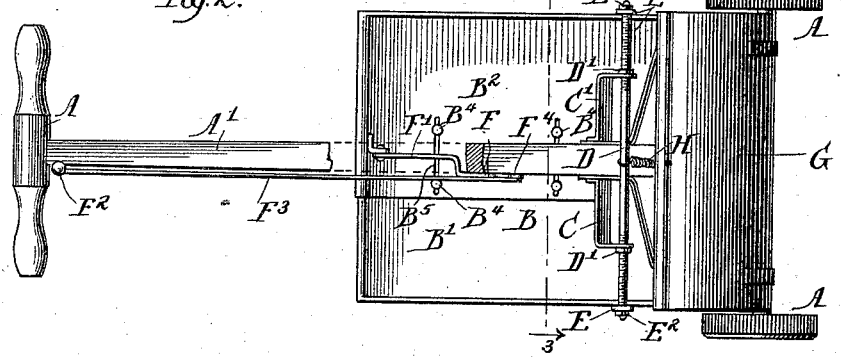
Figure 3:
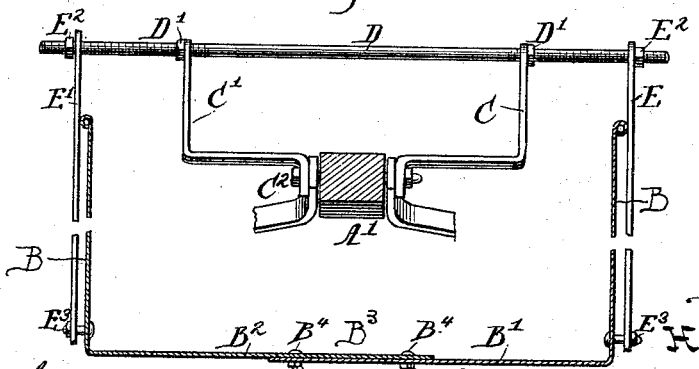

Referring to the accompanying drawings, which form a part of this specification, Figure 1 is a side elevation of a lawn-mower provided with our improvement. Fig. 2 is a top plan view of the same. Fig. 3 is a vertical section at the dotted line 3 3 in Fig. 2 of parts there shown.

Like letters of reference indicate corresponding parts throughout the several views.

A is any lawn-mower.

B is a receptacle for receiving grass as it is cut by the lawn-mower. The grass-receptacle B may be made in two parts $B'$ $B^2$, overlapping each other at $B^3$, so that the same may be widened or narrowed to adapt it to be used with lawn-mowers of any width. The overlapping portions of the receptacle B are secured together by means of bolts $B^4$, inserted through the slots $B^5$ therein. Whenever it is desired to widen or narrow the receptacle B, loosen the nuts $B^6$ on the bolts $B^4$ and slide the overlapping portions of the bottom thereof from or toward the sides of the same, and then tighten the nuts $B^6$ again.

C $C'$ are rectangular arms secured at their lower ends to the tongue $A'$ of the lawn-mower A by means of a bolt $C^2$.

D is a suspension-rod passed through holes in the upper ends of the arms C $C'$. The rod D is threaded at the end portions thereof and provided with nuts $D'$ to retain it in the holes in the parts C $C'$.

E $E'$ are suspending arms pivotally mounted by their upper ends upon the rod D, being retained thereon by means of nuts $E^2$.

$E^3$ are bolts pivotally connecting the lower ends of the arms E $E'$ with the forward ends of the sides of the grass-receptacle B near the bottom thereof.

F is a lever pivoted between its ends to the tongue $A'$ of the lawn-mower, the free end of the downwardly-extending arm $F'$ thereof being pivot-jointed to the rear portion of the grass-receptacle B.

$F^2$ is a dumping-lever pivot-jointed at its lower end to the tongue $A'$.

$F^3$ is a connecting-rod pivot-jointed by one end to the dumping-lever $F^2$ at a point a short distance from its connection with the tongue $A'$ and by the other end to the upwardly-extending arm $F^4$ of the lever F.

G is a hood for conducting the grass as it is cut into the receptacle B.

H is a spring connecting the hood G with the rod D, which prevents said hood from tipping forward when the lawn-mower is in use.

Obviously the arms E $E'$ may be slid inward or outward on the rod D to correspond with the lateral adjustment of the parts B $B'$ of grass-receptacles constructed like B when the same are to be connected with lawn-mowers of varying widths.

By employing grass-receptacles and the means for attaching the same to lawn-mowers, herein shown and described, it becomes unnecessary to manufacture more than one size thereof in order to adapt them for use on machines of any ordinary size.

Whenever it becomes desirable or necessary to empty the grass-receptacle B of its contents, the operator draws it backward and upward by pressing the lever $F^2$ forward to the position indicated by dotted lines in Fig. 1.

We claim—

1. In a lawn-mower, the grass-receptacle, the rectangular arms secured to the tongue $A'$, the suspension-rod passed through holes in the upper ends of the rectangular arms, the suspending arms pivotally mounted by their upper ends upon the suspension-rod and having pivotal connection by their lower ends with one end of the grass-receptacle, and means for supporting the other end of the receptacle, substantially as and for the purpose specified.

2. In a lawn-mower, in combination, the grass-receptacle, the lever F, pivotally connecting the same at one end with the tongue A' of the lawn-mower, the dumping-lever pivot-jointed at its lower end to the tongue, the connecting-rod pivot-jointed by one end to the dumping-lever and by the other end to the upwardly-extending arm $F^4$ of the lever F, and means for supporting the other end of the receptacle, substantially as and for the purpose specified.

3. In a lawn-mower, in combination, the grass-receptacle, the rectangular arms fast to the machine-tongue A', the suspension-rod having bearings in the upper ends of said arms, the suspending arms having pivotal connection with the suspension-rod and with the grass-receptacle near its forward portion, the lever pivoted between its ends to the tongue A', the free end of the downwardly-extending arm thereof being pivot-jointed to the rear portion of the grass-receptacle, the dumping-lever pivot-jointed at its lower end to the tongue, and the connecting-rod pivot-jointed by one end to the dumping-lever at a point a short distance from its connection with the tongue and by the other end to the upwardly-extending arm of the lever F, substantially as and for the purpose specified.

HORACE G. MILLER.
GRANT C. MILLER.

Witnesses:
J. H. HALE,
GEO. W. YOUNG.